United States Patent
Halford

(10) Patent No.: US 8,474,124 B2
(45) Date of Patent: Jul. 2, 2013

(54) TOOLING SYSTEM

(75) Inventor: Ben John Halford, Leicestershire (GB)

(73) Assignee: Surface Generation, Ltd., Leicestershire (GB)

( * ) Notice: Subject to any disclaimer, the term of this patent is extended or adjusted under 35 U.S.C. 154(b) by 1208 days.

(21) Appl. No.: 11/571,353

(22) PCT Filed: Jun. 29, 2005

(86) PCT No.: PCT/GB2005/002533
§ 371 (c)(1),
(2), (4) Date: Nov. 2, 2007

(87) PCT Pub. No.: WO2006/000817
PCT Pub. Date: Jan. 5, 2006

(65) Prior Publication Data
US 2008/0203640 A1     Aug. 28, 2008

(30) Foreign Application Priority Data
Jun. 29, 2004 (GB) .................................. 0414449.9

(51) Int. Cl.
*G02B 5/122* (2006.01)

(52) U.S. Cl.
USPC ............... 29/559; 29/558; 29/425; 269/266; 269/281; 269/269

(58) Field of Classification Search
USPC .......... 29/559, 558, 425, 56.5, 56.6; 269/266, 269/281, 269, 275, 277, 901
See application file for complete search history.

(56) References Cited

U.S. PATENT DOCUMENTS
6,015,214 A * 1/2000 Heenan et al. ................ 359/529

FOREIGN PATENT DOCUMENTS
WO         02064308  A1    8/2002
WO    WO 02064308  A1  *  8/2002
WO         2005061147 A     7/2005

OTHER PUBLICATIONS
International Preliminary Report on Patentability dated Jun. 12, 2006, in corresponding International Application No. PCT/GB2005/002533, filed Jun. 29, 2005.
International Search Report dated Jun. 12, 2006, in corresponding International Application No. PCT/GB2005/002533, filed Jun. 29, 2005.

* cited by examiner

*Primary Examiner* — David Bryant
*Assistant Examiner* — Christopher Besler
(74) *Attorney, Agent, or Firm* — Young Law Firm, P.C.

(57) ABSTRACT

A tooling system comprises a plurality of elements arranged in an array, the elements of the array being movable between a closed position in which the elements contact one another and are secured in position, and an open position in which the elements of the array are spaced apart and are capable of vertical movement relative to one another, characterized in that the tooling system further comprises means for retaining the elements of the array in a plurality of different relative vertical alignments. A method of operating the tooling system is also described, which method of operating includes at least the steps of moving the elements of the array into a first vertical alignment, machining the free ends of the elements according to a predetermined pattern and moving the elements of the array into a second vertical alignment in which the machined ends of the elements produce a desired surface contour.

10 Claims, 10 Drawing Sheets

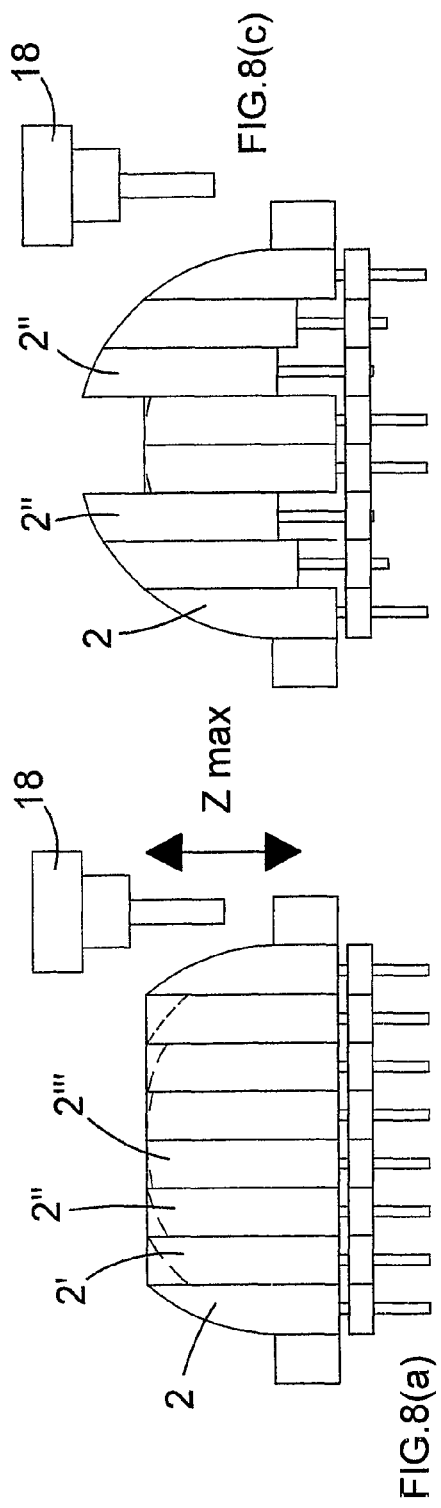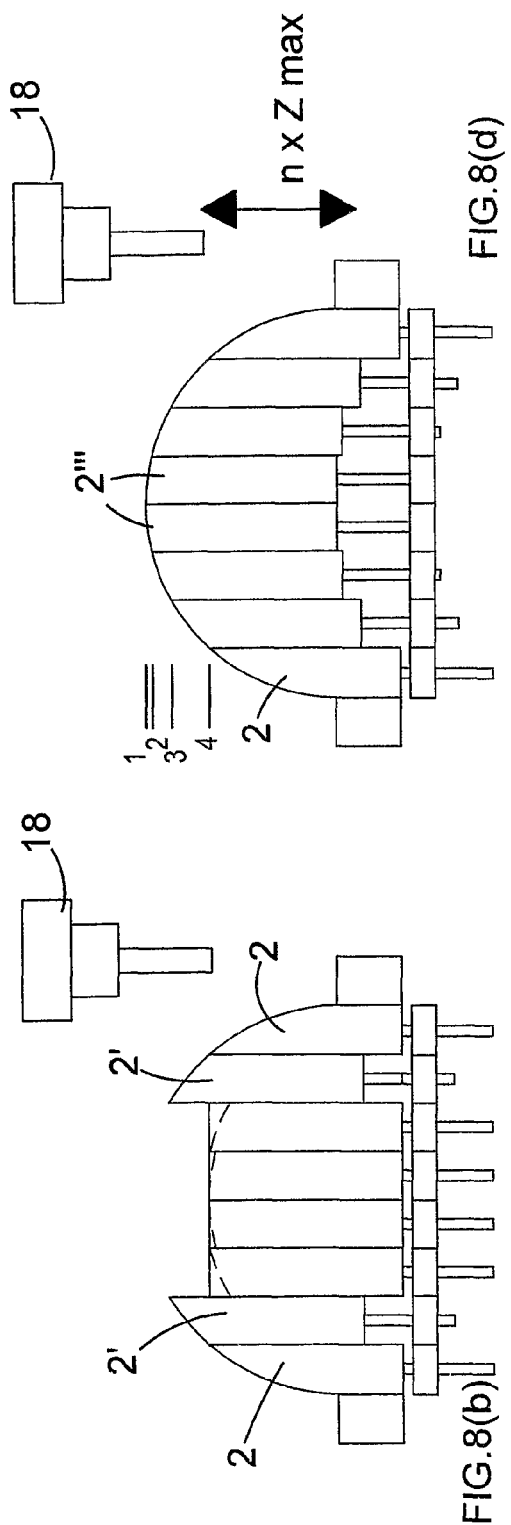

TOOLING SYSTEM

The present invention relates to an improved tooling system, and to an improved method of tooling using this tooling system.

International Patent Application No. WO 02/064308 describes and claims a tooling system comprising a plurality of elements arranged in an array, each element being moveable longitudinally relative to the other elements in the array and having a first end, the system Further comprising means to adjust the relative longitudinal positions of the elements such that the free ends of the elements define approximately a desired surface contour and means for retaining the elements in their adjusted positions, characterised in that: the first end of each element is provided on a machinable portion removably mounted to a base portion, the arrangement being such that the free ends of the elements can be machined to produce the desired surface contour.

International Patent Application No. WO 02/064308 further describes and claims a tooling system comprising a plurality of elements arranged in an array, the elements of the array being movable between a closed position in which the elements contact one another and are secured in position, and an open position in which the elements of the array are spaced apart and are capable of vertical movement relative to one another, and drive means for opening and closing the array. The elements are mounted on support rails to form the array.

Unpublished patent application GB No 0329979.9 describes and claims a tooling system comprising: a plurality of elongate elements each having an upper surface, said elements being arranged in an array to present said upper surfaces for machining by cutting tool means; support means for supporting said elements, each said element being supported on said support means for axial movement between upper and lower positions relative to the other elements in the array thereby to enable adjustment of the vertical position of said element surface; and clamping means for clamping the array of elements in a closed position in which the elements contact one another for enabling the free ends of the elements to be machined to produce a desired surface contour.

Unpublished patent application GB No 0329979.9 further describes and claims a method of tooling using a tooling system according to the first aspect of the invention, comprising: storing existing data representing the contour of the surface of each element including the z values of the surface at any given x,y coordinate point relative to a datum; storing new data representing a desired contour for the surface of each element position in the array including the z values of the surface at said any given x,y coordinate point relative to said datum; comparing said new data for a first, selected element position with the existing data for a first element in said selected element position; and adjusting the height of said first element to adjust said z values of said existing data at said any given x,y coordinate point to values at least equal to said z values of said new data at said any given x,y coordinate point.

Unpublished patent application GB No 0329980.7 describes and claims a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that the tooling system further comprises bolster means provided to align the elements during closing of the array and to hold the elements of the array securely in the closed and aligned position.

In applications where it is required that the desired surface contour includes a significant variation in height, it is a disadvantage of the tooling systems described above, that the cutting tool means must be dimensioned to accommodate this variation in height, leading to increased cost and complexity in the cutting tool means. In such applications, it is a further disadvantage that it may not always be possible to locate the clamping means in the most effective vertical location for all of the array elements, since the machinable surfaces of the "taller" array elements may not be supported in the horizontal plane by the outer, bolster means contacting array elements.

It is an object of the present invention to provide a tooling system, and a method of tooling using this tooling system in which the above disadvantages are reduced or substantially obviated. The present invention provides a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that the tooling system farther comprises means for retaining the elements of the array in a plurality of different relative vertical alignments.

The present invention further provides a method of operating a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that the method of operating includes at least the steps of moving the elements of the array into a first vertical alignment, machining the free ends of the elements according to a predetermined pattern and moving the elements of the array into a second vertical alignment in which the machined ends of the elements produce a desired surface contour.

In an alternative embodiment of the method of operating the tooling system, the method includes at least the steps of moving the elements of the array into a first vertical alignment, machining the free ends of a first selected group of the elements, moving the remainder of the elements of the array into a second vertical alignment, machining the free ends of at least a second selected group of the elements and repeating the third and fourth steps of this process until all of the elements have been machined to the desired surface contour.

The method of operation of the tooling system may further include the steps of separating a first group of elements of the array from a second group of elements of the array along a vertical split line, moving one said group of elements away from the other said group of elements in the horizontal plane, machining or removing one or more of the elements of the array exposed by the relative movement and moving one said group of elements back into contact with the other said group.

The present invention further provides a method of operating a tooling system which comprises a plurality of elements arranged in an array, the elements of the array being movable between a closed position in which the elements contact one another and are secured in position, and an open position in which the elements of the array are spaced apart and are capable of vertical movement relative to one another, and in which the elements of the array are mounted on a series of substantially parallel cross bars, characterised in that the method of operation includes at least the step of interchanging and/or rotating one or more cross bars.

A tooling system and a method of operating a tooling system will now be described with reference to the accompanying drawings, in which FIG. 1 is a side view of an element array of a tooling system, showing a desired surface contour;

Figure 1:
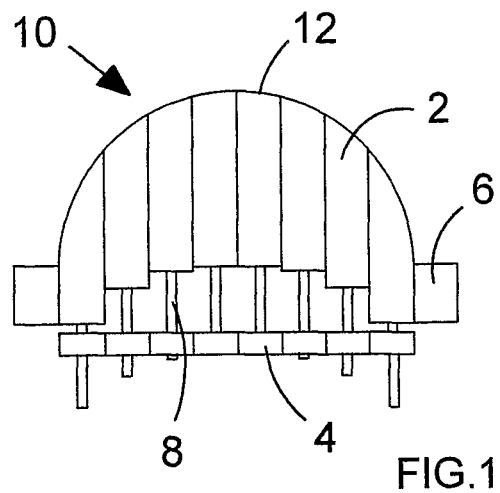
Figure 9A:
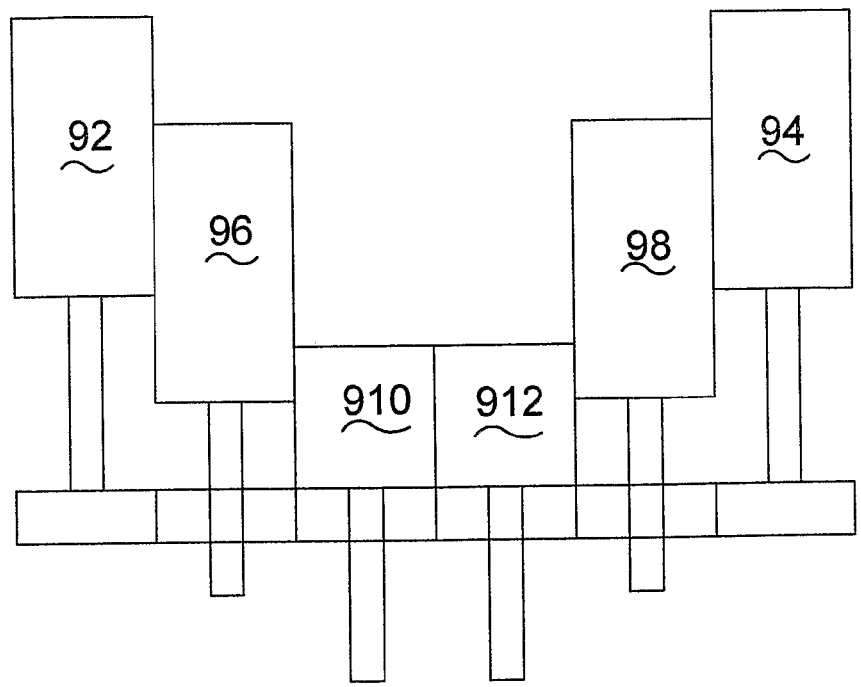
Figure 9B:
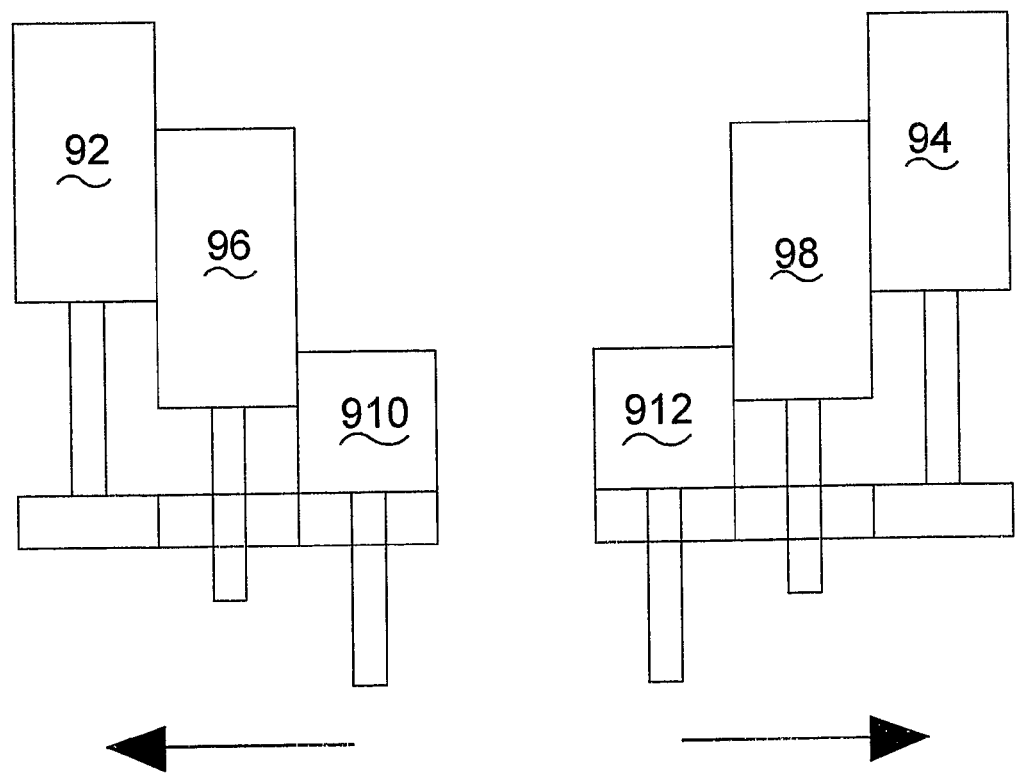
Figure 11A:
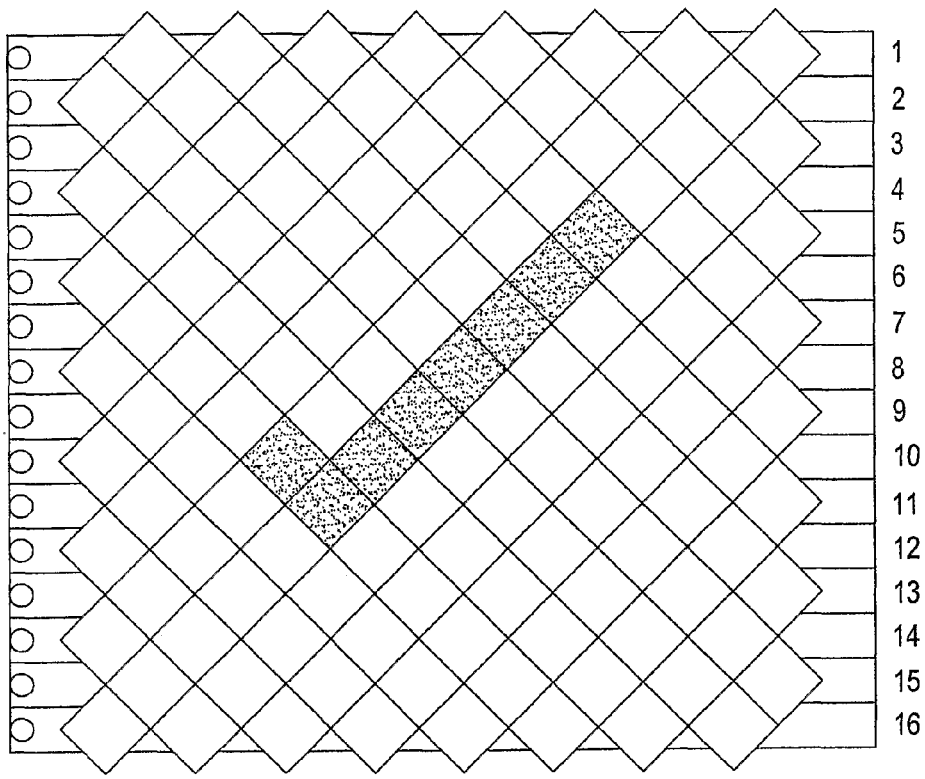
Figure 11B:
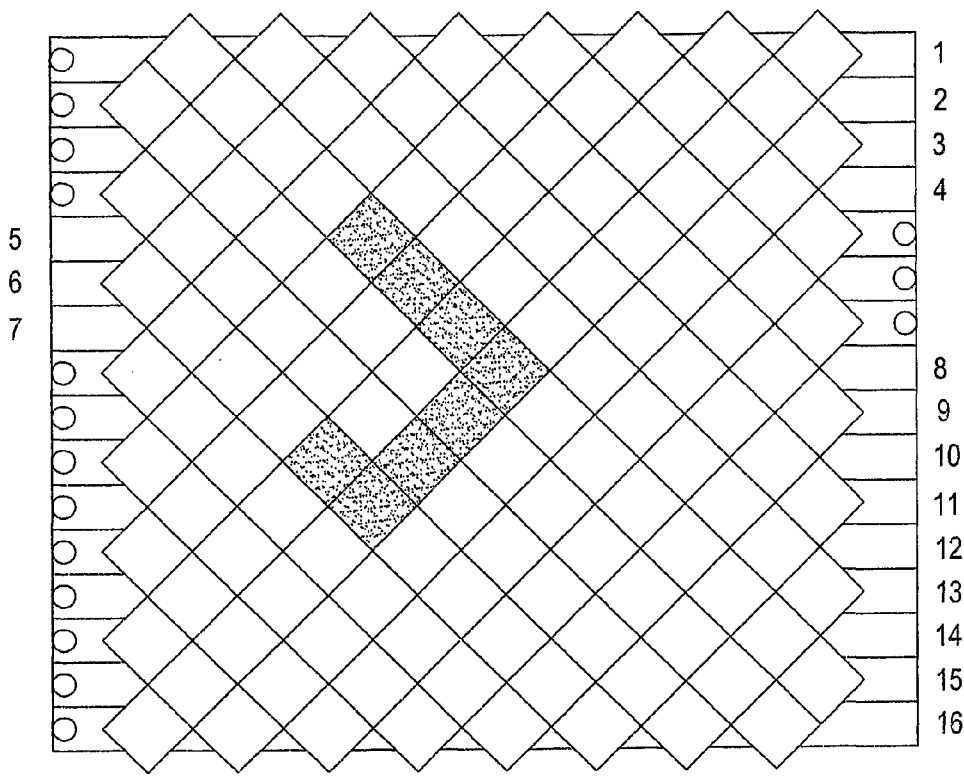
Figure 12A:
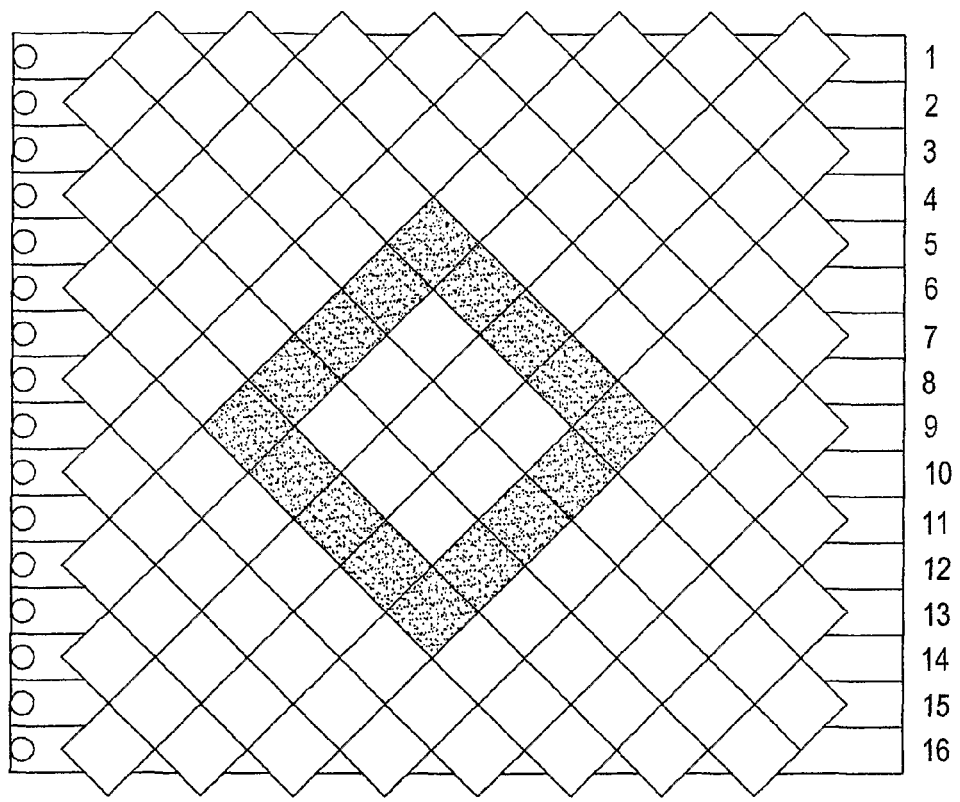
Figure 12B:
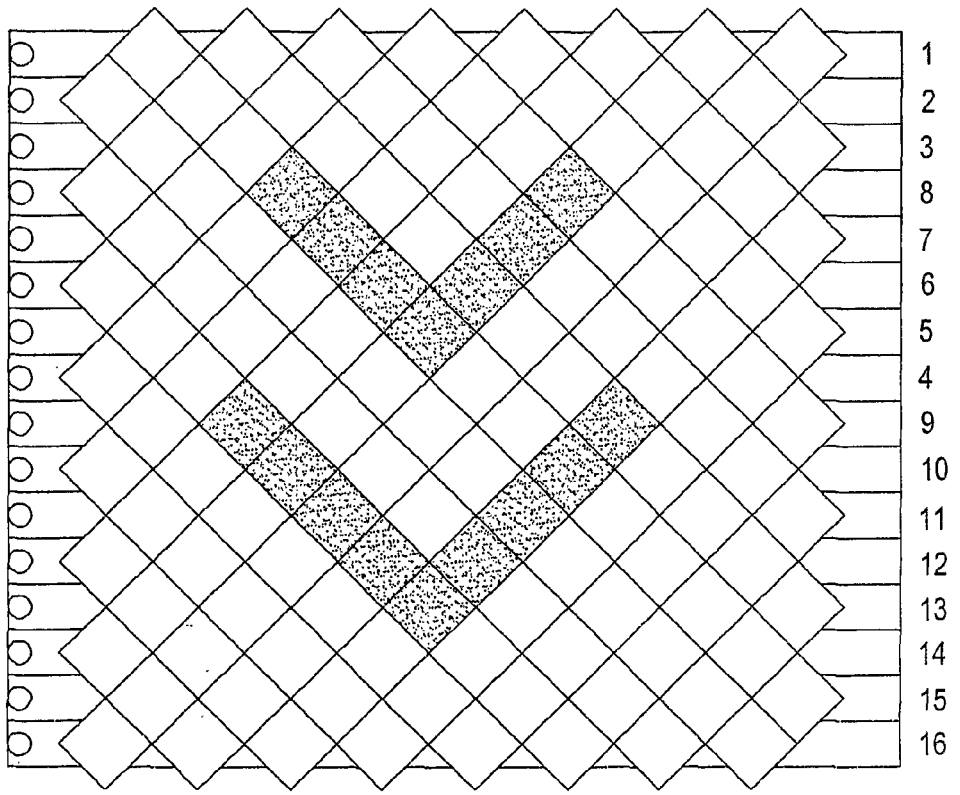
Figure 13:
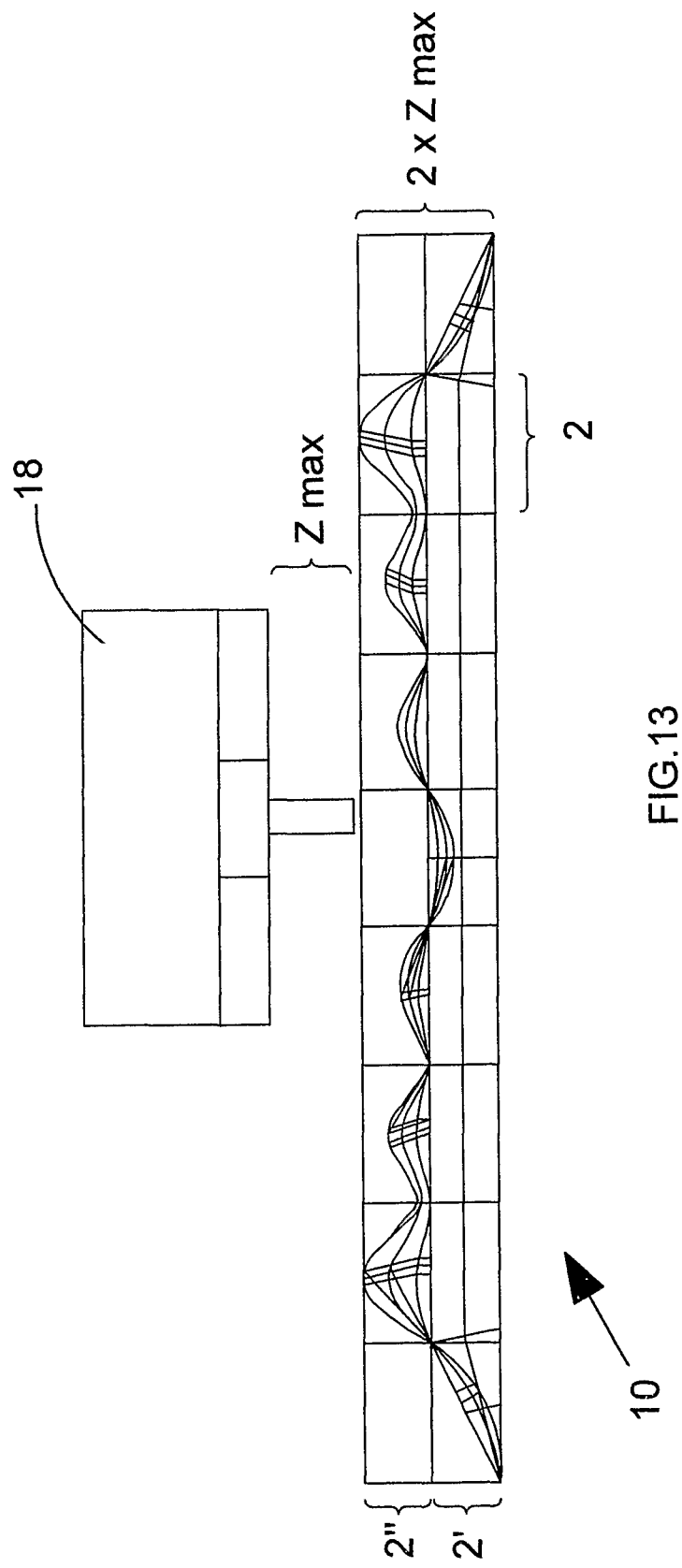
Figure 14:
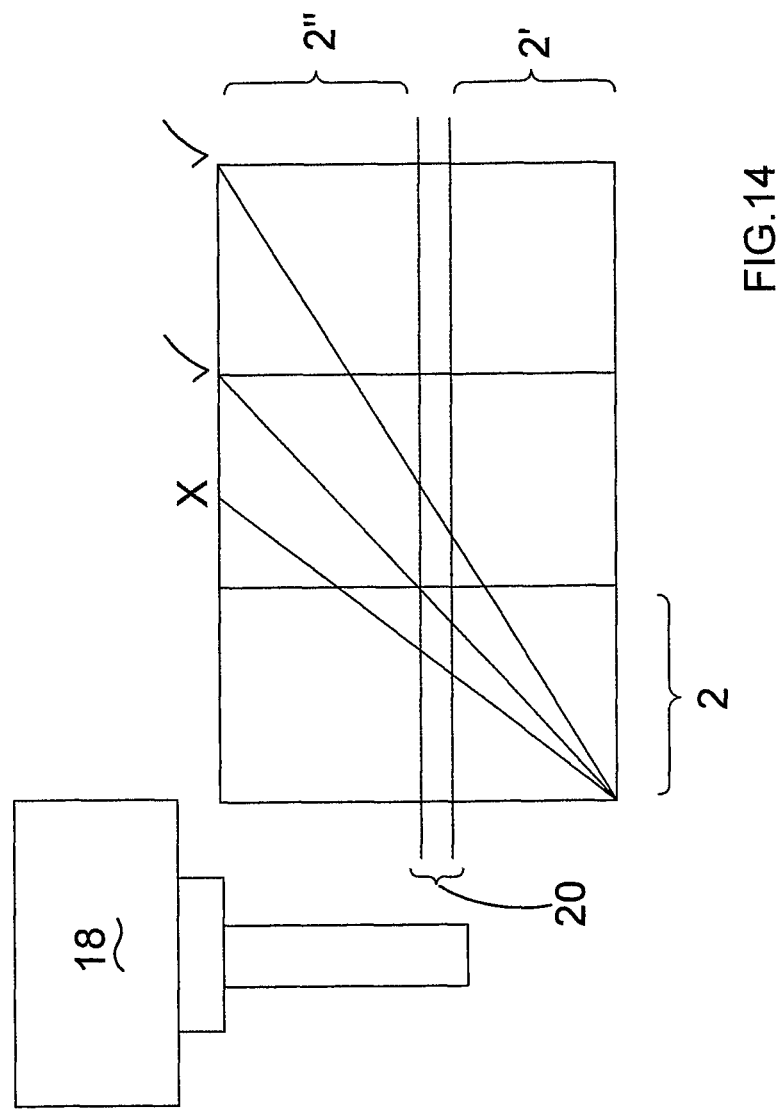
Figure 15:
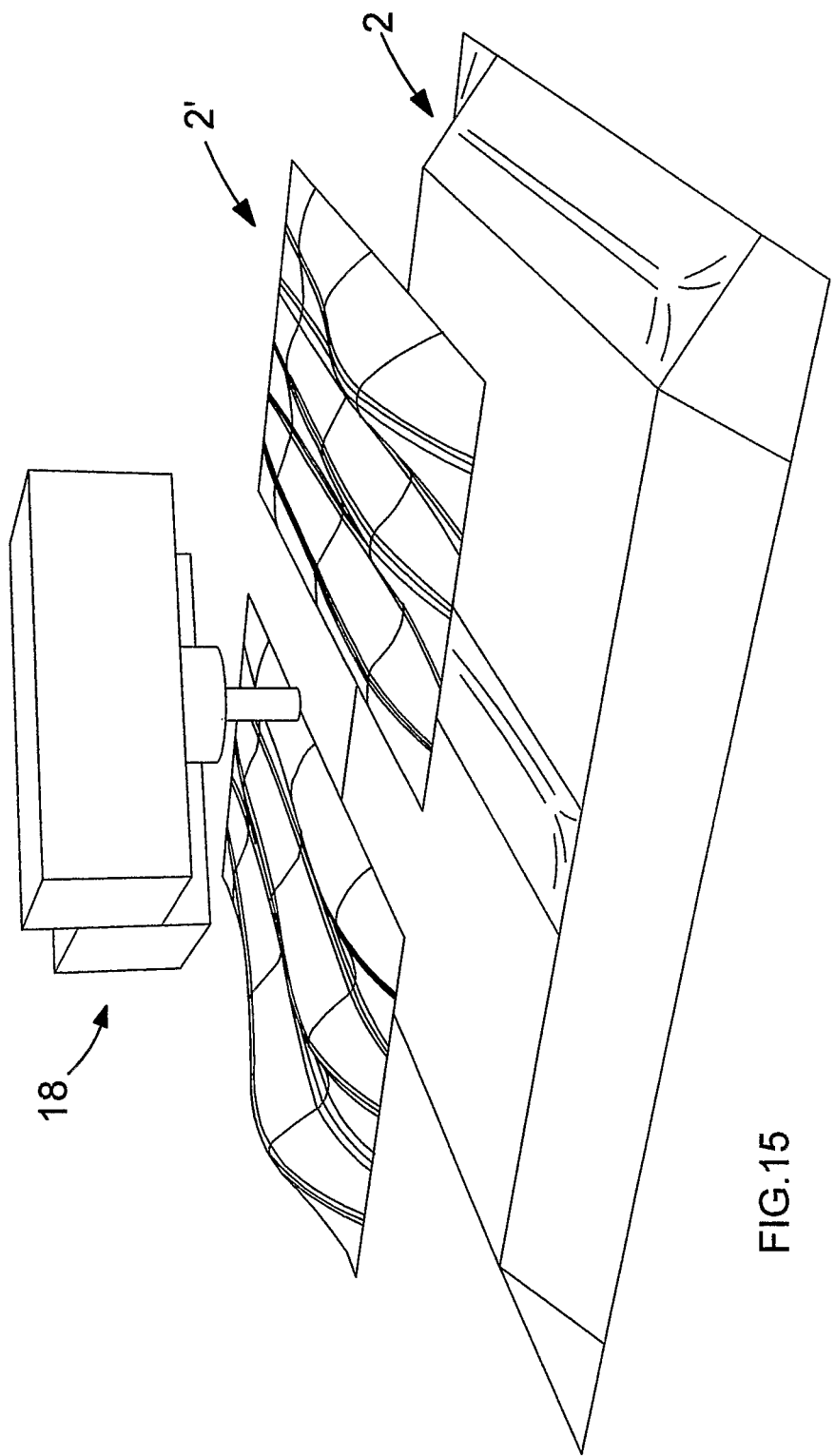

FIGS. 8(a), (b), (c) and (d) are side views of the element array of FIG. 1, showing the variation in depth of machining available as a result of the tooling system and method of operating of the present invention;

FIGS. 9(a) and 9(b) are side views of an element array showing the separation of a group of elements along a vertical split line;

FIGS. 10(a) and 10(b), 11(a) and 11(b) and 12(a) and 12(b) are plan views from above of an element array showing the interchanging of cross bars within the array and FIGS. 13, 14 and 15 each illustrate a telescopic build strategy.

FIG. 1 is an illustrative Example of a desired surface contour of a machined array element. In this Example, the desired contour is a dome with a height variation which would be difficult to achieve using a conventional cutting means.

An array shown generally at 10 of elements 2 is supported on cross rails 4 and secured by bolster means 6 as has been described in unpublished patent application GB 0329980.7. The elements 2 are supported on the cross rails by threaded pins 8 and terminate at their free ends 12 in a machinable component.

Figure 2:
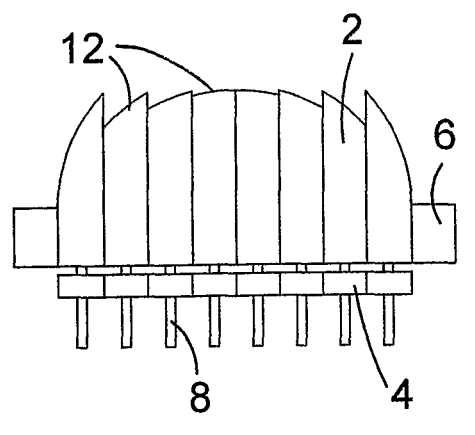
FIG. 2 is a side view of the element array of FIG. 1 showing the elements in a first vertical alignment, after machining.

In an earlier stage of the process, shown in FIG. 2 the "taller" array elements 2 of FIG. 1 have been lowered on their threaded support pins 8 so that their free ends 12 are in substantial horizontal alignment. FIG. 2 shows the pins after they have been machined and are ready for re-aligning into the surface contour shown in FIG. 1.

Figure 3:
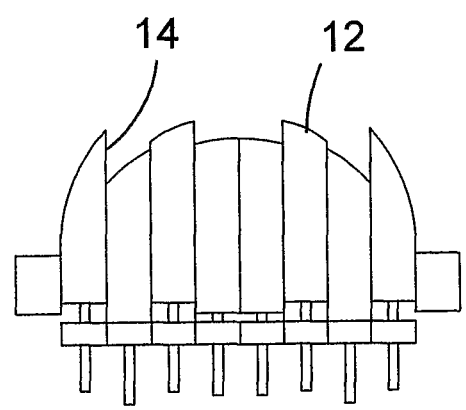
FIGS. 3 and 4 are side views of the element array of FIG. 1 showing an alternative method of vertical alignment of the array elements.
Figure 4:
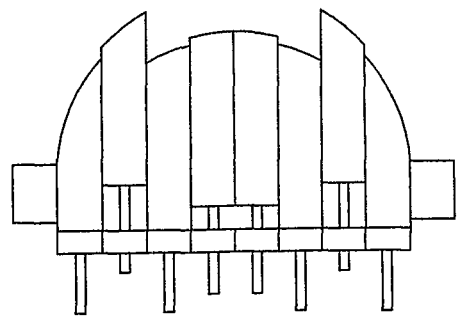

Considering next FIGS. 3 and 4, these Figures again show the array of FIG. 1, and illustrate the flat pack build strategy. Adjacent array elements are identified as Group 1 and Group 2 respectively. Selective raising and lowering of the elements of Group 1 relative to the elements of Group 2 (or vice versa) exposes the vertical faces of the relatively raised elements at 14, adjacent to their free ends 12 to improve access for the cutting means (not shown).

Figure 5:
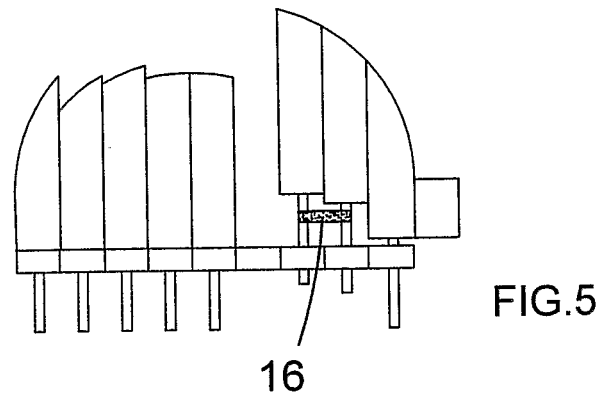
FIGS. 5, 6 and 7 are side views of the element array of FIG. 1, showing the use of ties to additionally secure the elements during and after machining.
Figure 6:
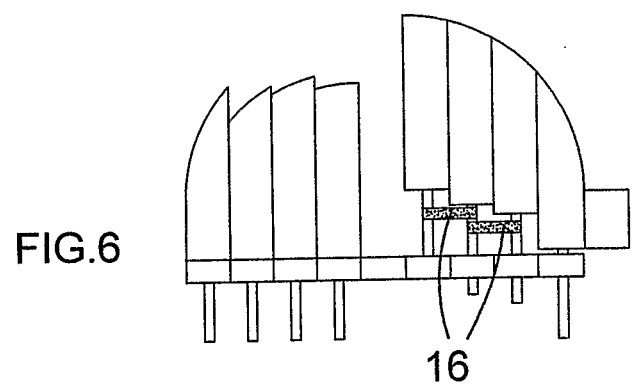
Figure 7:
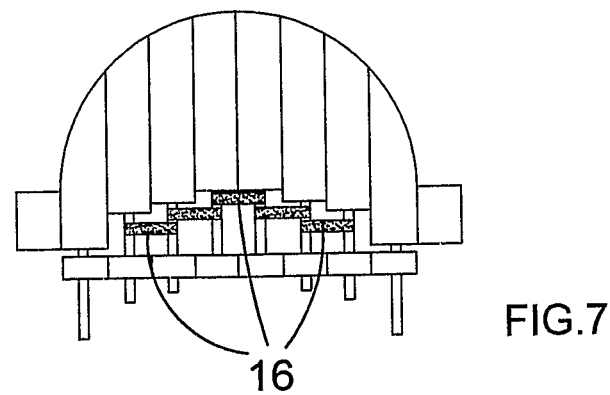

Considering next FIGS. 5, 6 and 7, these Figures again show the array of FIG. 1, but with adjacent array elements 2 fastened to each other by ties 16. As is shown in FIGS. 5, 6 and 7 a plurality of ties 16 may be used to secure adjacent elements at different vertical heights.

FIGS. 8(a), (b), (c) and (d) are side views of the element array of FIG. 1, showing the variation in depth of machining available as a result of the tooling system of the present invention, and its method of operation using the telescopic build strategy.

As can be seen in FIG. 8(a), a machine tool 18 is able to machine a maximum feature displacement in the Z direction, which is determined by the design of the tool. The free ends of the array elements are machined to a predetermined pattern in a number of different stages. As can be seen from FIG. 8(a), a first group of elements 2, which elements will be the lowest elements in the final contour, are machined. Elements 2', 2" and 2'" are not machined at this stage. In the next step, as can be seen from FIG. 8(b), the elements 2 are left in their original vertical alignment and the second group of elements, elements 2', are raised to a higher level and then machined. Similarly, as shown in FIGS. 8(c) and 8(d), the third and fourth groups of elements, elements 2" and 2'" respectively, are sequentially raised to levels 3 and 4, and machined, resulting in the desired surface contour of FIGS. 1 and 8(d).

FIGS. 9(a) and (9)b show a further alternative build strategy. In FIG. 9(a), the array elements are arranged at different relative vertical heights, the elements 92 and 94 being at a first vertical level, the elements 96 and 98 being at a second vertical level and the elements 910 and 912 being at a third vertical level.

In FIG. 9(b), the array elements have been allocated into two groups, the first group comprising array elements 92, 96 and 910 and the second group comprising array elements 94, 98 and 912. These first and second groups have been separated in the horizontal plane from one another, to provide improved access to the newly exposed array elements located along the split line or to a moulded part moulded in the tooling system, for machining of these elements or removal of the moulded part.

The method of operation of the tooling system according to the invention will be described with reference to the drawings, as alternative build strategies.

The first build strategy described above as a "Flat Pack Build Strategy", allows the user to flatten the final part into a single layer as shown in FIGS. 1 and 2. In this strategy, a single pin level, independent of geometry, is automatically generated by the operating software and this results in a number of advantages which include a reduction in the required Z capacity of the milling machine and an improvement of the available clamp force during machining due to the pin being in line with the bolster.

Where individual geometries may preclude this approach due to the need to access all sides of the pill for machining, an Alternating Flat Pack Build Strategy may be employed where the operating software identifies sets of alternate/adjacent pins which can be lowered out of the way in turn prior to machining. This is shown in FIGS. 3 and 4 and is preferably completed in two stages and allows access to all pins in turn.

The second build strategy described above as a "Telescopic Build Strategy", allows the user to machine parts with a depth or features that they would not be able to machine conventionally due to the limitations of the machine tool. By using software to automatically slice the desired final geometry into layers at predetermined points, while conforming to the rules illustrated in FIGS. 13 and 14, which govern the location of the split relative to the pin edges and any overlap 20 which may be specified by the operator to blend the parting line as illustrated in FIG. 14, it is possible to divide the part into layers and incrementally machine these in turn (as illustrated in FIGS. 13 and 15). This allows users to manufacture parts with a greater Z depth than their milling equipment can conventionally manage which is commercially advantageous, reduces the capital cost of said machinery and negates the need for intermediate processes such as spark erosion which are used to form deep recesses.

It will be appreciated that, although it is slightly less efficient to do so, it is also possible to machine each layer in any order if desirable, for example from the top down or middle first.

As can be seen from FIGS. 5, 6 and 7 it is also possible to use a third build strategy, an "Internal Scaffold Build Strategy". This is used where it is necessary or desirable to reinforce the pin tool structure; it is possible to modify the operating sequence to allow the user to access the underside of the pins on each cross rail in turn. This allows the addition of reinforcing elements and utility fixtures, for example compressed air, to the array which is beneficial from a functionality and structural point of view.

Additionally to ensure that during operation or upon application of the bolster clamp force the cross rails do not lift, this build strategy may also allow the operator to add restraining bars and bolts to hold the cross rails in place. It is also possible to modify the cross rails themselves to include faceted features such as a single angle or protrusion/recess to promote this effect.

The software described in unpublished patent application GB 0329979.9 may also be utilised to analyse the part geometry and calculate the preferred overlap between pins and the force which should be applied by the bolster to ensure adequate clamping whist avoiding over compression of the array.

Additionally the operating system may include the capability to use a camera or other optical device to analyse the alignment of the pins in the array such that a closed loop process can be used to automatically align the pins to optimise clamp force transmission between adjacent pins. This will also include the ability to receive feedback from a sensing device which will inspect each pin to determine if it is sufficiently clamped (e.g. via a tap test) and correct any loose regions.

The software will preferably also analyse the heights of the pins and adjust these to avoid natural frequencies based against the users preferred machining parameters. Where it is not possible to "tune" out these natural frequencies, the software may recommend alternate speeds and feeds to negate this.

The software will preferably also position the desired surface contour with respect to the array elements in the x, y and z dimensions in order to minimise the material usage and/or the number of slices, independent of the build strategy employed.

Further alternative build strategies, useful for example to allow the tooling of a mirror image of apart or the whole of a component, are shown in FIGS. 10(a) and 10(b), 11(a) and 11(b) and 12(a) and 12(b), which are plan views from above of an element array showing the interchanging of cross bars within the array.

In each of these Figures, the array elements are shown mounted on an array of substantially parallel cross bars, numbered 1 to 16 and running from left to right as in the Figures.

Figure 10A:
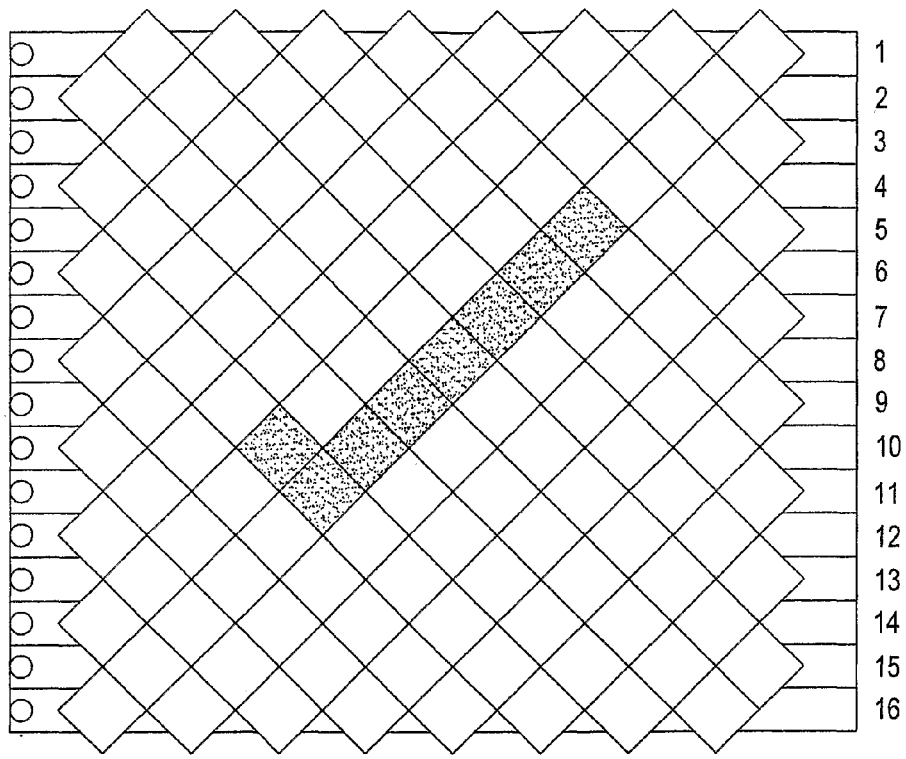
Figure 10B:
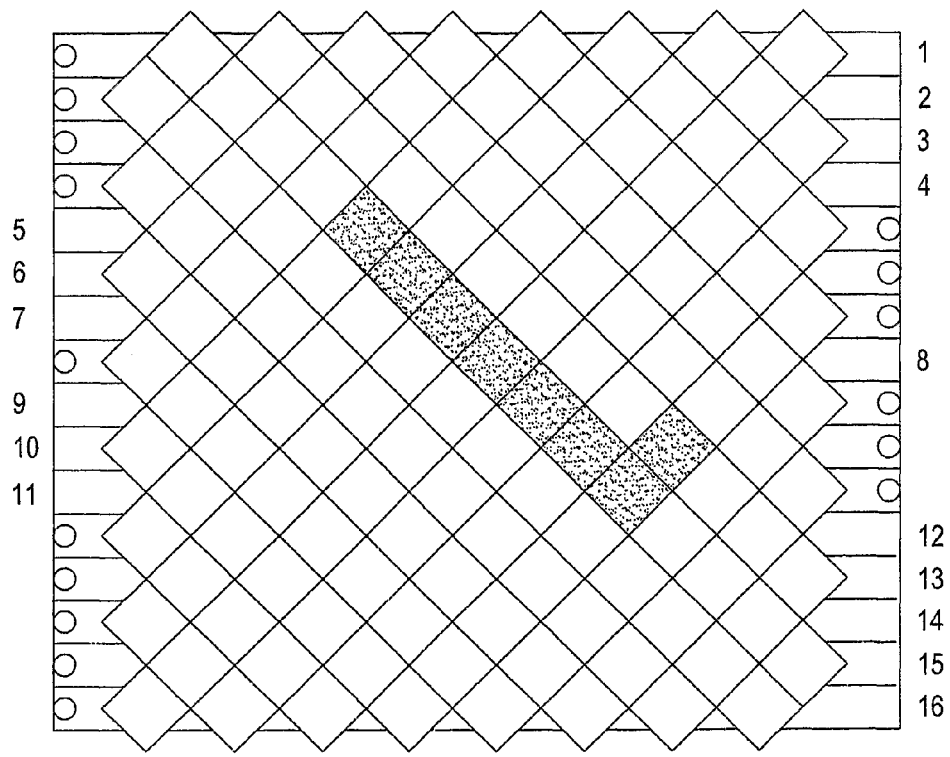

In each of FIGS. 10(a), 11(a) and 12(a), the crossbars are shown in their original positions and reference is made to the shaded array elements which have been machined. By interchanging and, where necessary, rotating the cross bars, as shown in FIGS. 10(b), 11(b) and 12(b), it is possible without further machining to provide a plurality of tools, thus adding to the versatility and cost-saving benefits of the tooling system according to the present invention.

It will be appreciated by the skilled addressee that the above build strategies are not mutually exclusive, and any combination of build strategies and software functions may be used.

The invention claimed is:

1. A method of operating a tooling system to produce a desired smooth, curved surface contour, the tooling system having a plurality of elements arranged in an array, the elements of the array being movable between a closed position in which the elements contact one another and are secured in position, and an open position in which the elements of the array are spaced apart and are capable of vertical movement relative to one another, which method of operating includes at least the steps of:
(i) firstly carrying out an opening step to move the elements of the array to the open position;
(ii) secondly carrying out a first moving step to move the elements of the array into a first alignment that is different from an alignment that produces the desired surface contour;
(iii) thirdly carrying out a first machining step to machine free ends of the elements according to a predetermined pattern;
(iv) fourthly carrying out a second moving step to move the elements of the array into a second alignment;
(v) fifthly carrying out a closing step to move the elements of the array into the closed position;
(vi) sixthly carrying out a separating step to separate a first group of elements of the array from a second group of elements of the array along a vertical split line;
(vii) seventhly carrying out a third moving step to move one of said first and second group of elements away from the other of said first and second group of elements in a horizontal plane;
(viii) eighthly carrying out a second machining step to machine one or more elements of the array exposed by the third moving step, and
(ix) ninthly carrying out a fourth moving step to move at least one of the first and second groups of elements such that the first and second groups are back into contact with one another, whereby the machined free ends of the elements produce the desired smooth, curved surface contour.

2. A method of operating a tooling system to produce a desired surface contour, the tooling system having a plurality of elements arranged in an array, the elements of the array being movable between a closed position in which the elements contact one another and are secured in position, and an open position in which the elements of the array are spaced apart and are capable of vertical movement relative to one another, which method of operating includes at least the steps of:
(i) firstly, carrying out a first moving step to move the elements of the array into a first vertical alignment;
(ii) secondly, carrying out a first machining step to machine the free ends of a first selected group of the elements;
(iii) thirdly, carrying out a second moving step to move a second selected group of elements into a second vertical alignment;
(iv) fourthly, carrying out a second machining step to machine the free ends of the second selected group of the elements, and
(v) fifthly, repeating steps (iii) and (iv) on a third, fourth and subsequent groups of elements until all of the elements of the array are machined to the desired surface contour.

3. A method according to claim 1, wherein the elements are supported on cross rails by threaded support pins.

4. A method according to claim 2, wherein the elements are supported on cross rails by threaded support pins.

5. A method according to claim 1 wherein, during step (ii), vertical faces of the moved elements are exposed.

6. A method according to claim 2 wherein, during step (iii), vertical faces of the moved elements are exposed.

7. A method according to claim 1, wherein the tooling system comprises a machine tool able to machine a maximum feature displacement, and wherein the first alignment is within the maximum feature displacement.

8. A method according to claim 2, wherein the tooling system comprises a machine tool able to machine a maximum feature displacement, and wherein the first and second alignments are within the maximum feature displacement.

9. A method according to claim 1, wherein the elements of the array are securable in the closed position by a bolster.

10. A method according to claim 2, wherein the elements of the array are securable in the closed position by a bolster.

* * * * *